July 29, 1969 — S. S. FOUSE — 3,458,647
BUS DUCT WITH IMPROVED MEANS FOR CONNECTING HOUSING STRUCTURES
Filed Aug. 10, 1967 — 3 Sheets-Sheet 1

July 29, 1969  S. S. FOUSE  3,458,647
BUS DUCT WITH IMPROVED MEANS FOR CONNECTING HOUSING STRUCTURES
Filed Aug. 10, 1967  3 Sheets-Sheet 2
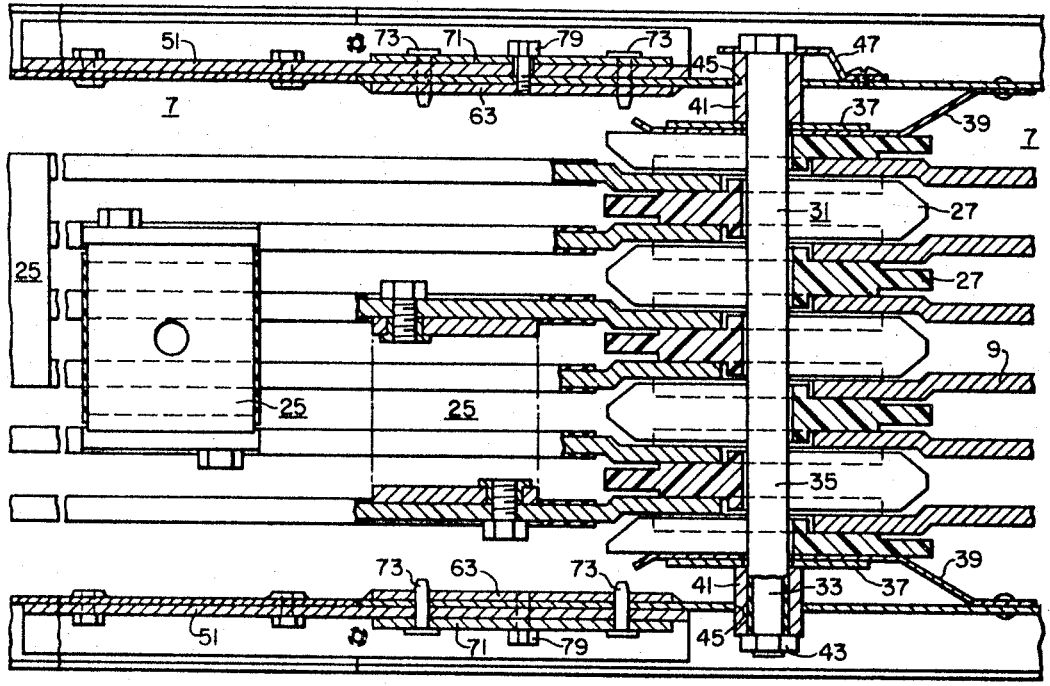
FIG. 4.
FIG. 6.
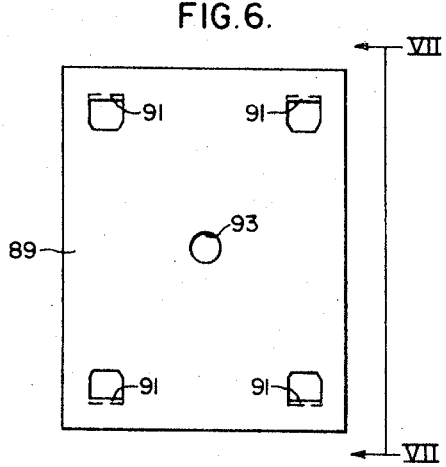
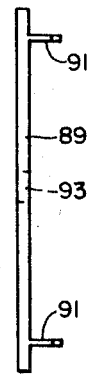
FIG. 7.
WITNESSES
Theodore F. Wrobel
James F. Young
INVENTOR
Samuel S. Fouse
BY
William A. Elchik
ATTORNEY

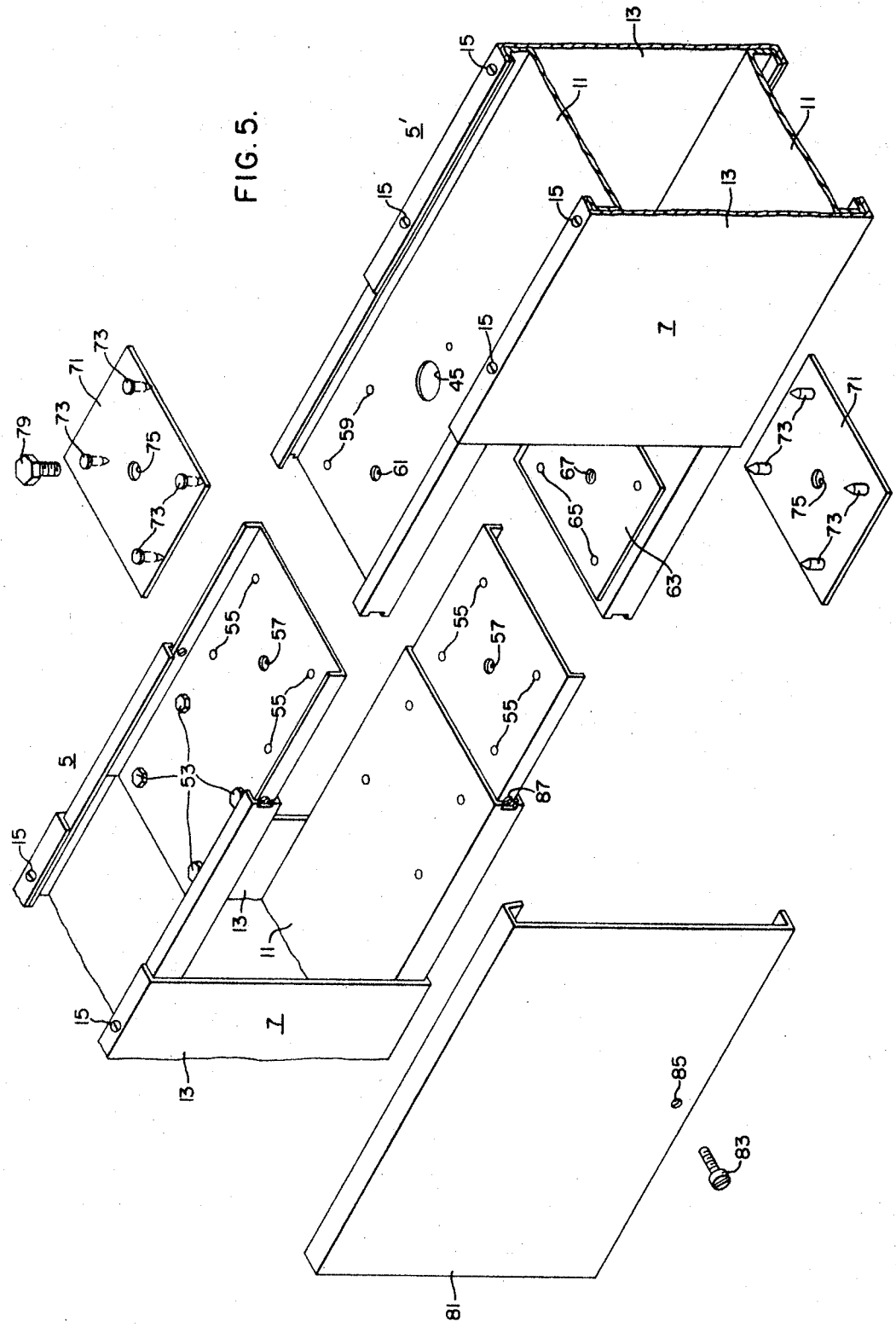

United States Patent Office 3,458,647
Patented July 29, 1969

3,458,647
BUS DUCT WITH IMPROVED MEANS FOR
CONNECTING HOUSING STRUCTURES
Samuel S. Fouse, Aliquippa, Pa., assignor to Westinghouse
Electric Corporation, Pittsburgh, Pa., a corporation of
Pennsylvania
Filed Aug. 10, 1967, Ser. No. 659,647
Int. Cl. H02g 15/08; H01b 7/00; F16l 9/22
U.S. Cl. 174—84                                              9 Claims

ABSTRACT OF THE DISCLOSURE

Improved bus duct comprises two sections with each section comprising a housing and a plurality of bus bars supported in the housing. Means is provided for connecting the sections together with improved means for connecting the housings of the sections together.

Cross-reference to related application

Certain features of the bus duct disclosed in this application are disclosed in the copending application of Samuel S. Fouse et al., Ser. No. 659,646, filed Aug. 10, 1967.

Brief summary of the invention

Improved bus duct comprises two sections with each section comprising a tubular housing and a plurality of bus bars supported in the housing. Means is provided for connecting the sections together with at least one housing wall of one section overlapping one housing wall of the other section at the connection. A splice plate, having at least one stud projection thereon, is connected to the overlapping walls with the stud projection protruding through aligned openings in the overlapping walls to provide increased strength at the connection.

Objects of the invention

An object of this invention is to provide improved bus duct comprising two sections and means for connecting the sections together with at least one wall of one section overlapping one wall of the other section at the connection and with a splice plate, having at least one stud projection thereon, connected to the overlapping walls with the stud projection protruding through aligned openings in the overlapping walls to provide increased strength at the connection.

A general object of this invention is to provide bus duct with improved means for connecting the sections of bus duct together.

Brief description of the drawings

FIG. 4 is a sectional view, with parts broken away, of two of the sections shown in FIGS. 1–3 connected together;

FIG. 5 is an exploded perspective view illustrating parts of the housing structures of the two sections of FIG. 4 prior to connection;

FIG. 6 is a plan view illustrating a different embodiment of the splice plate seen in FIGS. 4 and 5; and FIG. 7 is a side view of the splice plate shown in FIG. 6 looking in the direction of the VII–VII arrows.

Detailed description

Figure 1:
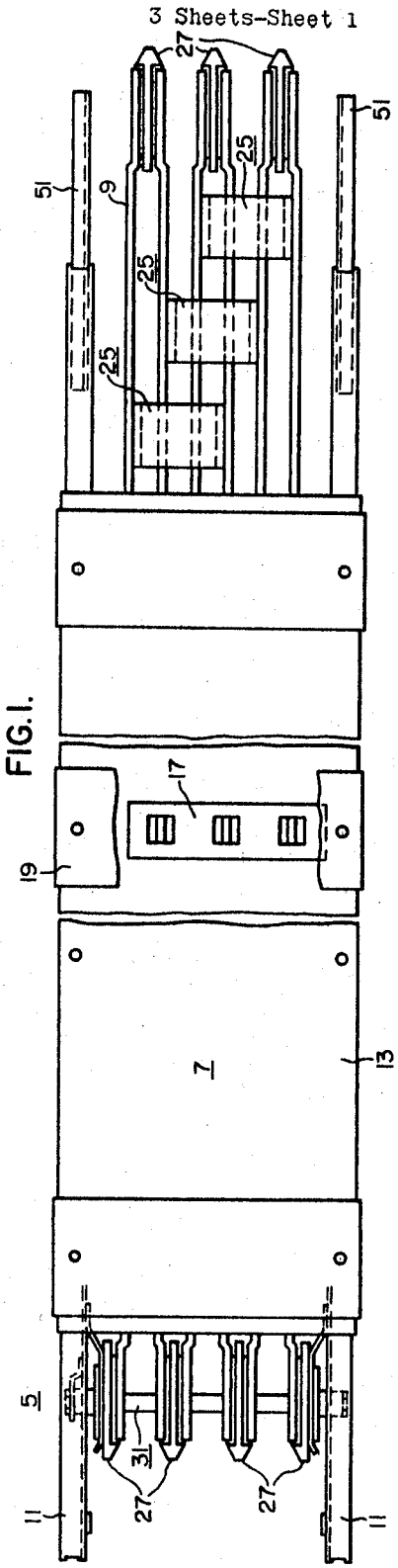
FIGURE 1 is a top view, with parts broken away, of a section of bus duct constructed in accordance with principles of this invention.
Figure 2:
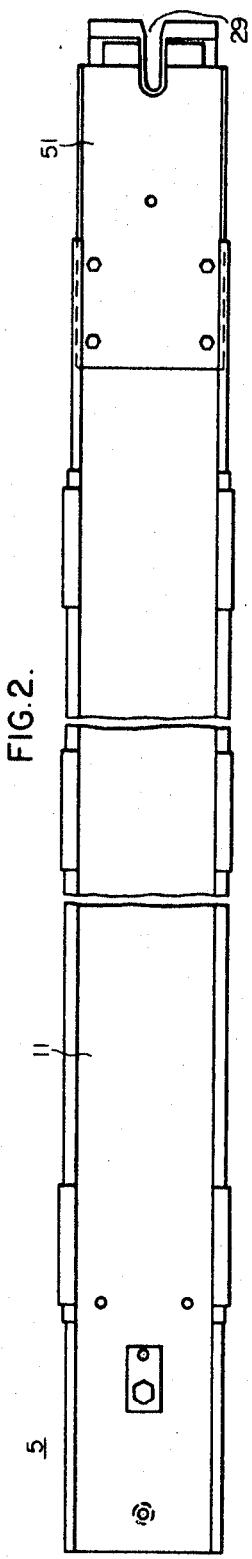
FIG. 2 is a side view of the bus duct section shown in FIG. 1.

Referring to the drawings, there is shown in FIGS. 1 and 2, an elongated section of bus duct 5 comprising an elongated housing 7 and a plurality of elongated flat bus bars 9 supported in the housing 7 in a generally parallel mutually flatwise end-to-end relationship in a single stack. The housing 7 is an elongated tubular (FIG. 5) housing comprising a pair of sheet steel channel-shaped wall members 11 forming a first pair of oppositely disposed walls and a second pair of sheet steel channel-shaped members 13 forming a second pair of oppositely disposed walls. As can be seen in FIG. 5, the members 11, 13 interlock and a plurality of screws 15 are mounted on the channel parts to secure the members 11, 13 together. The bus bars 9 (FIG. 1) are supported in the housing 7 by means of a plurality of insulating plug-in support members 17 that are molded with a plurality of slots therein for receiving the bus bars 9. The plug-in insulating support members 17 are positioned on opposite sides of the bus bars and drawn toward each other by suitable bolt means to capture the bus bars between the members 17 in a manner more specifically described in the above-mentioned copending patent application Ser. No. 659,646, filed Aug. 10, 1967. Each of the plug-in support members 17 is provided with a plurality of openings therein for receiving plug-in take-off connectors in a manner described in the above-mentioned copending patent application. A separate cover member 19 is removably secured to the housing over each of the plug-in supports 17 to cover the support when a plug-in unit is not mounted on the bus duct at the support. Each of the bus bars 9 comprises a conducting bar 21 (FIG. 3) and an insulating tube 23 thereon which covers the conducting bar 21 leaving the opposite ends of the conducting bar exposed for connection to other bus bars and leaving portions along the length of bus bars exposed for connection to the plug-in take-off connectors, and for connection to a U-shaped coupling member 25 (FIG. 1). Three conducting coupling members 25 are mounted on the bus bars with each member 25 electrically connecting two different bus bars in order to provide a two-bar per phase three-phase bus duct systems in a manner more specifically described in the above-mentioned copending application.

Figure 3:
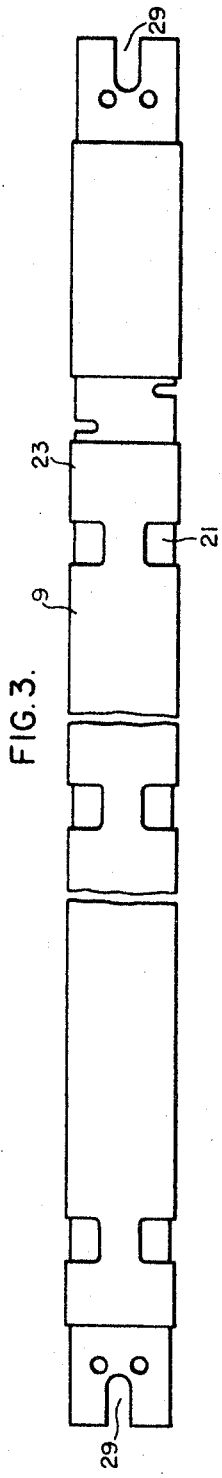
FIG. 3 is a side view of one of the bus bars from the section shown in FIG. 2.

A plurality of molded rigid insulating members 27 are supported at the opposite ends of the bus bars 9. The bus bars and insulating members are provided with aligned slots 29 (FIGS. 2 and 3). A single-bolt structure 31 (FIG. 1) is connected and supported at one end of the section.

The single-bolt structure 31 comprises an elongated metallic bolt member 33 (FIG. 4) and an insulating tube 35 supported over the shank of the bolt. A pair of washer members 39 are positioned on the outside of a pair of support members that are secured to the housing 7, and a pair of insulating spacers 41 are positioned abutting the washers 87. A nut 43 is threadedly connected to the lower end of the bolt 33. The bolt 33 and insulating tube 35 extend through openings in the spacers 41, the washers 37 and the support members 39, and through the slots in the insulating members 27 and bus bars 9 at the one end (on the left as seen in FIG. 1) of the housing section 7.

When it is desired to connect the bus duct section 5 (FIG. 4) to an identical bus duct section 5', one of the sections is moved longitudinally relative to the other section with the three pairs of bus bars and insulators (at the end seen on the right in FIG. 1) of the section 5 extending into the spaced openings between the bus bars and insulators (at the end seen on the left in FIG. 1) of the section 5' and with the slots 29 (FIG. 3) of the section 5 receiving the bolt 33 and insulating tube 35 of the section 5' in a manner shown in FIG. 4. As can be seen in FIG. 4, each of the bars of the section 5 laps a bus bar of the similar section at the connection. Thereafter, the nut 43 is tightened drawing the insulating spacers 41, washers 37, support members 39, insulating members 27 and bus bars 9 into a compact pressure-connected relationship. As can be seen in FIG. 4, the spacers 41 extend through openings 45 (FIG. 5) in the wall members 11. Thus, the connection is independent of the housing and the connection can be tightened and loosened from outside of the housing. As can be seen in FIG. 4, a support plate 47 which is removably secured to the one housing member 11, is provided with a hexagonal opening for receiving the hexagonal bolt-head to key with the bolt-head in order to prevent rotation of the bolt so that the connection can be tightened by merely tightening the nut 43 when a worker has access only to the bottom (FIG. 4) of the housing. It can be understood that the support plate 47 could be mounted to key with the nut 43 permitting the worker to merely rotate the bolt-head in order to tighten the connection from the top of the housing.

The two sections 5 and 5' shown partially in FIG. 4 are of identical construction. It can be understood that when the two identical sections are connected together the left-hand end (FIG. 1) of the one section is connected to the right-hand end (FIG. 1) of the other section.

As can be understood with reference to FIGS. 1, 2 and 5, a separate sheet steel plate 51 is secured to each of the wall members 11 at one end of the housing 7 by means of four bolts 53. Each of the plates 51 is provided with four openings 55 therein at the four corners of an imaginary rectangle and a center opening 57. At the other end of each section 5 (the other end being seen as the section 5' in FIG. 5), each of the members 11 is provided with four openings 59 at the four corners of an imaginary rectangle and a center opening 61. An additional sheet steel plate 63, having four openings 65 aligned with the openings 59 and a tapped opening 67 aligned with the openings 61, is welded to the underside of each of the wall members 11. Two sheet steel splice plates 71 are also provided at the connection. Each of the splice plates 71 is provided with a center opening 75 and four steel stud projections 73 that are fixedly secured to the plate at the four corners of an imaginary rectangle.

As can be understood with reference to FIG. 1, the opposite wall members 13 terminate short of the bus bars 9 at the opposite ends of the section. The opposite wall members 11 extend past the bus bars and bolt structure 31 on the left as seen in FIG. 1. The opposite wall members 11 extend past the ends of the opposite wall members 13 on the right as seen in FIG. 1 and the plates 51, that are secured to the wall members 11, terminate short of the ends of the bus bars on the right. As will be understood with reference to FIGS. 1, 2, 4 and 5, when the bus duct section 5 is connected to the bus duct section 5', the wall members 11 of the section 5' receive the plates 51 of the section 5 in a nested lapping relationship with the openings 55, 57 in the plates 51 aligning with the openings 65, 67 respectively in the plates 63 and with the openings 59, 61 respectively, in the members 11 of the housing section 5'. Thereafter, the splice plates 71 are moved into the positions shown in FIG. 4 with the associated stud projections 73 protruding through the associated aligned openings 55, 59, 65. Thereafter, the bolt members 79 are passed through the associated opening 75 in the associated splice plates 71 and through the associated openings 57, 61 in the associated wall members 11, which bolts are threaded into the associated tapped openings 67 in the associated plates 63 to thereby secure the associated wall members 11 of the two sections together. As can be understood with reference to FIGS. 1, 4 and 5, when the sections are brought together into the connected position shown in FIG. 4, the upper (FIG. 4) and lower walls are closed and the other opposite walls of the housing at the connection are open. When the sections are connected, a separate sheet steel cover plate 81 is mounted on the housings at each of the two opposite sides of the housings at the connection by means of a bolt member 83 that passes through an opening 85 in the cover plate 81 and that is threaded into a tapped opening 87 in one of the plates 51.

The tapered stud projections 73 help to align the bus duct sections when the splice plates 71 are moved into the mounted position. Only one bolt 79 is required to mount each splice plate 71 in the field and the four stud projections 73 on each plate 71 provide extra shear strength and rigidity at the connection.

A modification of the splice plate is shown in FIGS. 6 and 7. Referring to FIGS. 6 and 7, a sheet steel plate member 89 is provided with a center opening 93 and four bent-over tabs 91 that are formed from the flat plate 89. The splice plate 89 may be used at the connection in the same manner that was hereinbefore described with reference to the splice plate 71. When the splice plate 89 is used, it can be understood that the openings in the wall members 11, plates 51 and plates 63 are formed to receive the bent-over tabs 91 which are shaped differently from the stud projections 73 hereinbefore described.

I claim as my invention:

1. Bus duct comprising two bus duct sections, each of said sections comprising a housing and a plurality of bus bars supported in the housing, each of said housings comprising four walls forming an elongated tubular housing, means connecting said sections together with a first wall of one of said housings overlapping a second wall of the other of said housings at the connection, each of said first and second walls having a bolt-receiving opening therein and a stud-receiving opening therein, said first and second walls being positioned at said connection with said bolt-receiving openings being aligned and with said stud-receiving openings being aligned, a splice plate having a bolt-receiving opening therein and a stud projection thereon, said splice plate being positioned on said first wall with the bolt-receiving opening of said splice plate aligned with said aligned bolt-receiving openings of said walls and with said stud projection extending through said aligned stud-receiving openings, tapped means on said second wall, and a bolt member extending through said aligned bolt-receiving openings and being threaded into said tapped means to secure said splice plate to said overlapping walls.

2. Bus duct according to claim 1, an additional plate supported on the inner side of said second wall, and said tapped means being a tapped opening in said additional plate.

3. Bus duct according to claim 2, said additional plate having a stud-receiving opening therein receiving said stud projection.

4. Bus duct according to claim 3, said splice plate having a plurality of said stud projections thereon, said overlapping walls and said additional plate having aligned openings therein for each of said stud projections, and each of said stud projections extending through the associated aligned openings in said overlapping walls and said additional plate.

5. Bus duct according to claim 3, said splice plate comprising a generally flat plate with said stud projections being bent-over projections formed integral with said splice plate.

6. Bus duct according to claim 1, said splice plate having a plurality of said stud projections thereon, said overlapping walls having aligned openings therein for each of said stud projections, and each of said stud projections extending through the associated aligned openings in said overlapping walls.

7. Bus duct according to claim 6, said plurality of stud projections being disposed on said splice plate at the four corners of an imaginary rectangle.

8. Bus duct according to claim 6, and said splice plate comprising a generally flat plate with said stud projections being bent-over projections formed integral with said splice plate.

9. Bus duct according to claim 1, said splice plate comprising a generally flat plate with said stud projections being bent-over projections formed integral with said splice plate.

References Cited

UNITED STATES PATENTS

| | | | |
|---|---|---|---|
| 3,189,679 | 6/1965 | Scofield | 174—84 |
| 3,377,421 | 4/1968 | Ericson | 174—84 |

DARRELL L. CLAY, Primary Examiner

U.S. Cl. X.R.

174—68, 88; 138—155